(No Model.) 2 Sheets—Sheet 1.
H. A. BENEDICT.
PHOTOGRAPHIC CAMERA.
No. 493,747. Patented Mar. 21, 1893.
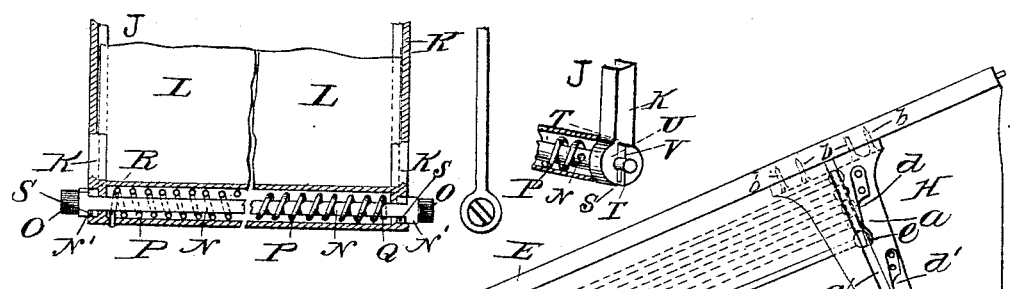
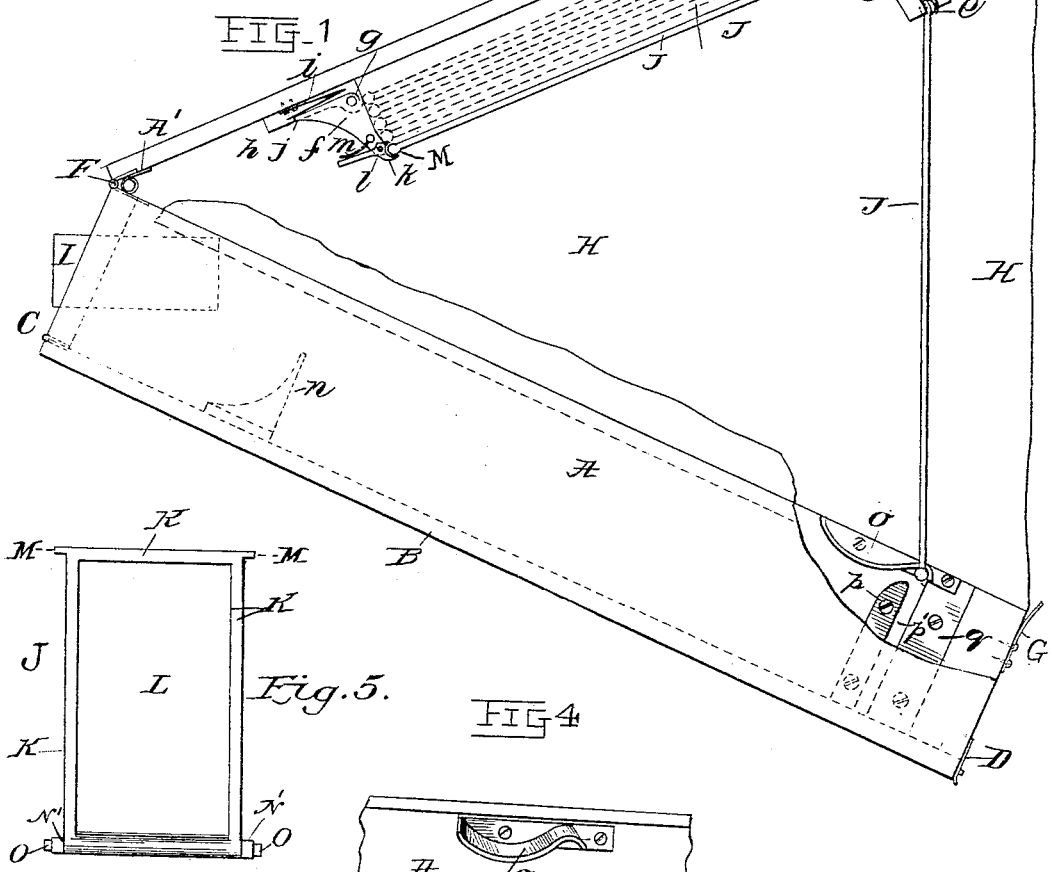
WITNESSES:
Edward C. Rowland
J. E. Hoffman
INVENTOR
Hiram A. Benedict
BY Phillips Abbott
ATTORNEY

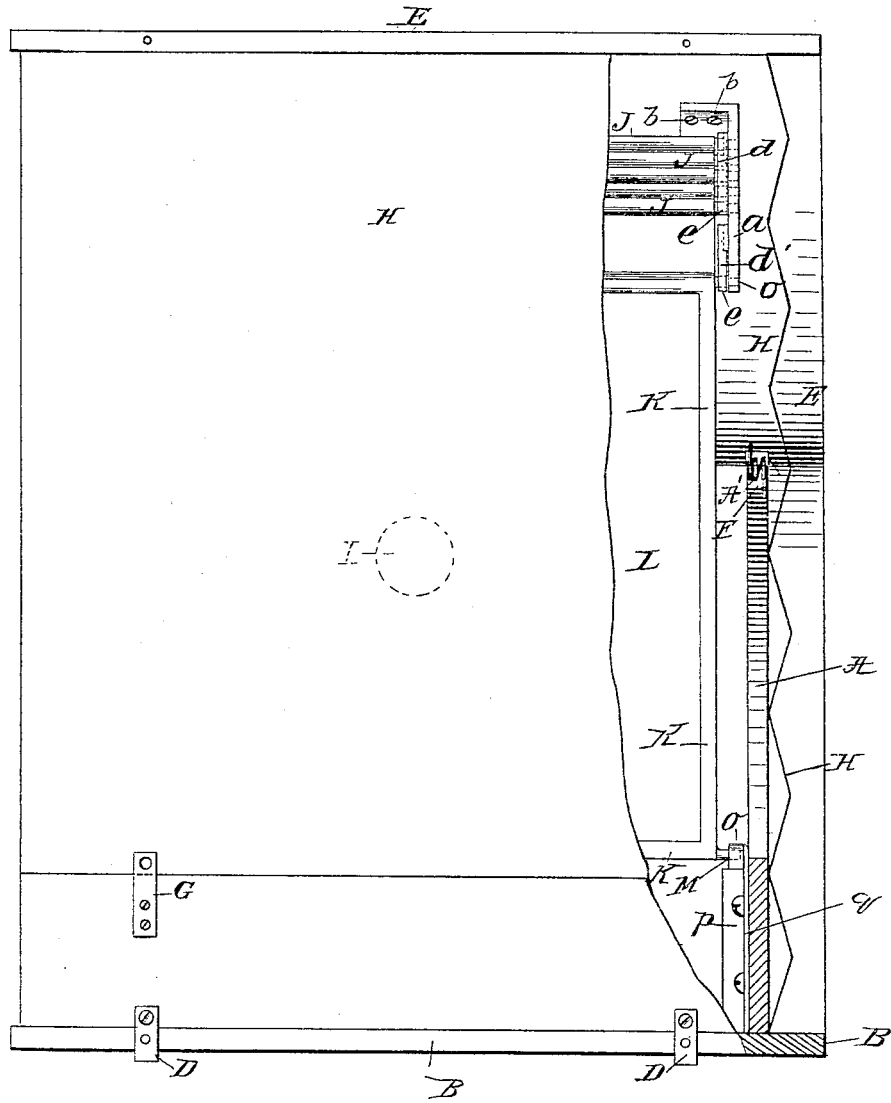

UNITED STATES PATENT OFFICE.

HIRAM A. BENEDICT, OF BROOKLYN, NEW YORK.

PHOTOGRAPHIC CAMERA.

SPECIFICATION forming part of Letters Patent No. 493,747, dated March 21, 1893.

Application filed August 4, 1892. Serial No. 442,102. (No model.)

*To all whom it may concern:*

Be it known that I, HIRAM A. BENEDICT, a citizen of the United States, and a resident of Brooklyn, in the county of Kings, and State of New York, have invented certain new and useful Improvements in Photographic Cameras, of which the following is a specification.

My invention relates to a new and useful improvement in magazine photographic cameras of the kind sometimes called collapsing or folding cameras, and it consists in the construction, arrangement and combination of the parts hereinafter set forth.

In the drawings, Figure 1, is an elevation of the apparatus shown in its open position, the side of the bellows and a portion of the side of the camera box which are toward the observer being taken away to expose the interior arrangement. Fig. 2, is a detail of the lower portion of one of the plate holding frames, partly in section. Fig. 3, is a detail of the spring and its co-acting parts which secure the proper movement of each plate holder. Fig. 4, is a detail, shown partly in perspective of one of the deflecting plates whereby the loose or swinging end of the plate holders are guided as will be hereinafter explained. Fig. 5, is an elevation reduced in size as compared to the other figures, of one of the plate holders. Fig. 6, is an elevation taken from the rear end of the camera, showing the cover open and the bellows or like device removed at the rear to disclose the interior of the camera.

A is the camera box. B is its under side hinged at C and provided with a catch D, whereby the interior of the camera box may be reached for the removal of the plates upon which pictures have been taken and for the insertion of unexposed plates.

E, is the upper side or cover. It is hinged at F to the front of the camera box and provided with a catch G.

H, is a bellows like device; it is tacked, glued or otherwise fastened to the edges of the camera box at or near the upper part thereof and also to the two edges of the cover E, and across the rear sides of both the cover and the camera box so as to exclude light irrespective of the position of the cover E. When the cover is closed down, the bellows fold together they being made with gusset like folds, those at the side of the structure, being triangular in shape, or rather running to a point at or near the hinge F, thus there is no obstruction to the closing of the cover E.

I is the lens tube. It is provided with the ordinary appliances for focusing the lens and is set at an angle relative to the camera box proper A, so that the focal axis will be at right angles to the sensitive surface of the plates as hereinafter explained.

J, J, &c., are the plate holders; they are made as shown in Figs. 2, 3 and 5. That is to say, they have a metallic or other frame K, within which is the sensitive plate L, and at one end the frame K is provided with laterally extending pins or projections M, M. These may be easily made by inclosing a wire in the frame K, the ends of which project laterally, say an eighth to a quarter of an inch. At the end of the plate holder, opposite the wire, there are appliances somewhat resembling the spring tension devices of an ordinary Hartshorn roller, (best illustrated in Fig. 2,) in which N is a rod which extends clear across the frame of the plate holder, having squared portions O, O, on its ends and P is a spring attached as at Q to the rod N, and at the other end at R, it is attached to the frame K. The rod N is provided with two stops S, S, which strike against a suitable surface as at T, see Fig. 3., whereby the spring may be put under tension, and which will be held against unwinding by the pin or stop S striking against the shoulder T. The plate holder is allowed to move independently of the rod N, because there is a cut out space U in the frame K, which allows of substantially a one half revolution of the rod N before the pin S strikes the shoulder T.

*a, a,* are two slotted frames attached by screws *b*, or by any other suitable means to the cover E, on each side thereof. *c, c,* are slots which extend longitudinally through each of these frames *a*.

*d, d',* are two spring catches curved at their free ends and fastened at their other ends to the frames *a, a*.

*f, f,* are two pieces of metal pivoted at *g* to blocks *h*, which are fastened to the cover E.

*i, i,* are springs, the free ends of which bear against a toe $j, j$, one on each of the pieces $f$, so that the springs normally rock the pieces $f$, upon their pivots $g$.

$k$ are two escapement devices pivoted respectively at $l$ to the pieces $f$ and are each provided with a spring $m$ which normally throws the escapements downwardly.

$n$ is a tripping device located in the bottom of the camera box proper upon the part B.

$o$ is a guide plate for the purposes hereinafter described. There are two of them, one on each side of the camera box, at or near the upper edge of each side.

$p$ is a guide plate and $q$ is another guide plate, which co-acting with the plate $p$, serve to guide the plate holders as hereinafter explained. These guides $p$ and $q$ are made in duplicate one on each side of the camera box and are arranged and fashioned as shown.

The operation is as follows: To supply the camera with unexposed plates the operator when in the dark room takes the plates one by one and with their sensitive surfaces all facing upwardly, in other words toward the cover E, introduces them into the camera by turning the camera over on its cover E and opening the bottom B and then taking the plates one at a time, he introduces them in such manner that the flattened square end O of the bar N on each of the plate holders, fits into and slides through the slots in the pieces $a$ fastened to the cover E, the squared part O upon one end of the bar or rod N entering the slot $e$ in the right hand frame $a$ and the other squared part O entering the like slot in the left hand frame $a$. During the placing of the plate holders in the position just described and while sliding the squared ends O through the slots as stated, the spring catches $d$ and $d'$ are held out of the way by the fingers of the operator so that all of the plates pass above or beyond the uppermost catch $d$. When a sufficient number of the plates have been introduced as above stated, then the operator, in order to move their other ends up against the cover E, presses back with one hand the escapement $k$ and also rocks the piece $f$ by compressing the spring $i$, and then with the other hand he presses all the plates together backwardly against the cover E and beyond the escapement $k$, the rocking of the pieces $f$ permits this to be done easily. During this swinging movement of the plate holders, it will be observed that the flattened square ends O of the bar N engaging in the slots $c$ on the frame J generate an additional tension in the springs P, so that when the escapement releases one of the plate holders, this spring operates it and swings it back again into its original position.

The plate holders being in the position above described, $i. e.$ held up against the cover E by the upper catches $d$ and the escapements $k$, the hinged cover E is closed, whereupon the ends of the escapements $k$ against which the springs $m, m$, bear, are brought into contact with the tripping device $n$, whereby the escapements are rocked upon their pivots and that end of the lowermost plate holder is allowed to drop out of the escapements. The upper portion of the escapements by reason of their oscillation upon their pivots, enter between the first and second plate holder and hold up the second one and all behind or above it. The freed end of the plate holder drops upon the bottom B of the camera box, and upon again lifting the cover E, the spring P attached to the other end of this plate holder, causes it to swing in a rearward direction aided also in most cases by the action of gravity, until the laterally projecting pins M, M, see Fig. 5, strike against the guide plates $p$ on each side of the camera box. The pins resting against these plates as the cover E is still further opened, slide upwardly and finally guided by the deflecting plates $o$ and by the upper portion of the plates $p$, assume the position at its lower end shown in Fig. 1. Its rearmost end, however, that upon which the spring P is placed, is held up to this time, by the uppermost pair of catches $d$ which partially encircle the hub like portions N', N' of the bar or rod N and consequently the plate is not in exactly the right focal plane. The operator then exerts a little force in further opening the cover E; this disengages the hubs of N', N' of the plate holder from the spring catches $d$, the squared ends of the rod N travel through the slots $c$ until the hubs N' engage in the curved or hooked part $e$ of the second pair of spring catches $d'$. When in this position the surface of the plate holder is in proper focal plane.

For taking the picture: The exposure will now be made in the ordinary manner, and in order that it may not be necessary for the operator to continually hold up the cover E, so as to support the plate holder J in its proper position, as shown in Fig. 1, I provide a stiff spring A' at or near the hinge F, which is sufficiently powerful to maintain the cover E and its load of plates and also the plate J in proper position for taking a picture. After the picture has been taken, in order to dislodge the plate holder which has been exposed, the operator moves the cover E still farther outwardly by exerting the requisite force which dislodges the hub like parts N' of the bar N from the second pair of catches $d'$. It then drops under the action of gravity. The pins M, M, sliding through the slot like ways $p'$ made by the guide plates $p, p$, and $q, q$, the upper end of the plate meantime falls over forwardly and in this manner the plate holder comes to rest in the bottom of the camera box A. To make another exposure, the operation is repeated until all of the plates are used up.

I claim—

1. In a photographic camera, the combination of a case, one side whereof is adapted to be opened, means for excluding the light attached to the movable side and also to the body of the case, a frame upon the movable side, adapted to support the rear ends of a series of plate holders, a spring controlled escapement which supports the front ends of the plate holders and a device which trips the escapement upon the closing of the movable side to release the forward end of each plate holder, substantially as set forth.

2. In a photographic camera, the combination of a case, one side of which is adapted to be opened, means for excluding the light, attached to the movable side and also to the body of the case, a frame on the movable side provided with spring catches adapted to support the rear ends of a series of plate holders, a spring controlled escapement which supports the front ends of the plate holders and means against which the escapement strikes upon closing the movable side whereby the escapements are tripped and the forward ends of the plate holders successively released, substantially as set forth.

Signed at New York, in the county of New York and State of New York, this 29th day of July, A. D. 1892.

HIRAM A. BENEDICT.

Witnesses:
PHILLIPS ABBOTT,
D. SOLIS RITTERBAND.